(12) United States Patent
Dye et al.

(10) Patent No.: US 6,633,837 B1
(45) Date of Patent: Oct. 14, 2003

(54) METHOD AND SYSTEM FOR GENERATING SOFTWARE CODE USING A SYMBOLIC LANGUAGE TRANSLATOR

(75) Inventors: Lester W. Dye, Dillon, MT (US); David B. Wagner, Nederland, CO (US)

(73) Assignee: Object Reservoir, Austin, TX (US)

( * ) Notice: Subject to any disclaimer, the term of this patent is extended or adjusted under 35 U.S.C. 154(b) by 0 days.

(21) Appl. No.: 09/419,717

(22) Filed: Oct. 14, 1999

(65) Prior Publication Data (65)

(51) Int. Cl.[7] .................................. G06G 7/50
(52) U.S. Cl. .................... 703/9; 703/2; 703/10
(58) Field of Search ............. 703/10, 2; 717/135, 717/146, 136

(56) References Cited

U.S. PATENT DOCUMENTS

| | | | |
|---|---|---|---|
| 5,103,421 A | | 4/1992 | Ward et al. ............ 395/700 |
| 5,289,567 A | | 2/1994 | Roth .................... 395/133 |
| 5,408,638 A | * | 4/1995 | Sagawa et al. ............ 716/20 |
| 5,442,569 A | * | 8/1995 | Osano .................. 716/230 |
| 5,526,475 A | * | 6/1996 | Razdow ................. 707/538 |
| 5,537,641 A | * | 7/1996 | da Vitoria Lobo et al. . 345/419 |
| 5,557,773 A | * | 9/1996 | Wang et al. ............... 707/3 |
| 5,668,374 A | * | 9/1997 | DiFoggio et al. ...... 250/339.12 |
| 5,675,147 A | * | 10/1997 | Ekstrom et al. ............ 250/256 |
| 5,784,553 A | * | 7/1998 | Kolawa et al. ............. 714/38 |
| 5,796,678 A | * | 8/1998 | Pisetski ................. 367/38 |
| 6,018,497 A | * | 1/2000 | Gunasekera .............. 367/72 |
| 6,106,561 A | * | 8/2000 | Farmer ................. 703/10 |
| 6,151,566 A | * | 11/2000 | Whiffen ................ 703/10 |
| 6,219,831 B1 | * | 4/2001 | Ono ................... 717/136 |
| 6,236,738 B1 | * | 5/2001 | Zhu et al. ............. 382/107 |
| 6,247,049 B1 | * | 6/2001 | Scott .................. 709/222 |
| 6,256,038 B1 | * | 7/2001 | Krishnamurthy ......... 345/419 |
| 6,271,856 B1 | * | 8/2001 | Krishnamurthy ......... 345/581 |
| 6,272,556 B1 | * | 8/2001 | Gish .................. 709/315 |
| 6,353,801 B1 | * | 3/2002 | Sercu et al. .............. 702/65 |
| 6,487,312 B2 | * | 11/2002 | Kostrzewski et al. ...... 382/232 |

FOREIGN PATENT DOCUMENTS

EP   0 320 818   6/1989 ............. G06F/9/44

OTHER PUBLICATIONS

Koreic, J. "Hybrid System for Multi–language and Multi–environment Generation of Numerical Codes", ACM, Jul. 1, 2001, pp. 209–216.*

Wang, P., S. "Graphical User Interfaces and Automatic Generation of Sequential and Parallel Code for Scientific Computing", IEEE, 1988, pp. 486–492.*

(List continued on next page.)

Primary Examiner—Russell Frejd
Assistant Examiner—Dwin M. Craig
(74) Attorney, Agent, or Firm—Gray Cary Ware & Freidenrich, LLP (57) ABSTRACT

An improved method and system are disclosed for creating on a computer a native operators and test code file for a finite element simulator to model fluid flow in porous media. The method of the present invention includes the steps of inputting into a symbolic language translator equations and parameters describing the model to be created by the simulator and generating one or more model objects from the equations and parameters. The method of the present invention further includes the steps of generating a symbolic representation of the residual and tangent matrix operators of the model objects and generating optimization rules for any geometric invariant quantities. Numeric core code and data structure initializing core code are generated for the simulator in a high level programming language from the language of the symbolic language translator. The numeric core code is formatted and optimized. The present invention generates the native operators and test code file by processing the splice file through the symbolic language translator.

33 Claims, 6 Drawing Sheets

OTHER PUBLICATIONS

Weerawarana, S. and Wang, P., "A Portable Code Generator for CRAY FORTRAN", ACM Transactions on Mathematical Softwrae, vol. 18, No. 3, Sep. 1992, pp. 241–255.*

H.A. Barker and M. Zhuang, "Control system analysis using Mathematica and a graphical user interface", "Computing & Control Engineering Journal" Apr. 1997, pp. 64–69.*

Stephen, Wolfram, "The Mathematica Book", 1996, Wolfram Media/Cambridge University Press, pp. 173–223.*

"The Student Edition of MATLAB for Macintosh Computers", The MathWorks, Inc. Prentice–Hall, Inc. 1992, pp. 463–466.*

Shun Doi et al., "Automatic Parallel Program Generation for Finite Element Analysis," Proceedings of the IFIP TC2/WG2.5 Working conference, Oxford, UK, Jul. 8–12, 1996, pp. 255–266.

J. Korelc, "Automatic Generation of Finite–Element Code by Simultaneous Optimization of Expressions," Computer Algebra, 5th Rhine Workshop (RWCA), vol. 187, No. 1–2, pp. 231–248.

Ioakimidis, "Application of Mathematica to the Direct Semi–Numerical Solution of Finite Element Problems," Computers and Structures, UK, Dec. 3, 1992, vol. 45, No. 5–6, pp. 833–839.

Kinshuk, "Development of a User–Friendly Interface for the Creation of User Elements," International Journal of Electrical Engineering Education, UK, Oct. 1996, vol. 33, No. 4, pp. 344–352.

Purcell, "Building Finite Element Models with Mathematica," 1997 Mathematica Developer Conference, Oct. 1997.

International Search Report dated Mar. 28, 2002.

*Extending the Built–in Format Rules* by Mark Sofronion, Loughborough University of Technology, Leicestershire. The Mathematica Journal, 1993 Miller–Freeman Publications. pp. 74–80.

* cited by examiner

FIG. 4

$$R = \{ \text{Interior}[\text{GDT}[$$
$$\int_\Omega \delta_w [w \partial_t \partial_t (-\kappa t \phi)] + \int_\Omega \delta_w [w \nabla \cdot \nabla (-\kappa \phi)] +$$
$$\int_\Omega \delta_w [w (\nabla^+ \cdot \{\phi d_{1,0}, \phi d_{1,1}, \phi b_1\} + \phi c_1)]]]\}$$

FIG. 1

$$\{\{(\kappa t \partial_t N_1 \partial_t \phi + \kappa \partial_{x0} N_1 \partial_{x0} \phi + \kappa \partial_{x1} N_1 \partial_{x1} \phi) \int_\Omega N\{0\} + (\int_\Omega N\{2\}) C_1\phi_1 +$$
$$(\int_\Omega N\{1,1\}) (C_1\phi_2 + C_1\phi_3 + C_1\phi_4) + (\int_\Omega N\{2\}) (\partial_t \phi b_1 + \partial_{x0} \phi d_{1,0} + \partial_{x1} \phi d_{1,1}).$$
$$(\kappa t \partial_t N_2 \partial_t \phi + \kappa \partial_{x0} N_2 \partial_{x0} \phi + \kappa \partial_{x1} N_2 \partial_{x1} \phi) \int_\Omega N\{0\} + (\int_\Omega N\{1\}) C_1\phi_2 +$$
$$(\int_\Omega N\{1,1\}) (C_1\phi_1 + C_1\phi_3 + C_1\phi_4) + (\int_\Omega N\{2\}) (\partial_t \phi b_1 + \partial_{x0} \phi d_{1,0} + \partial_{x1} \phi d_{1,1}).$$
$$(\kappa t \partial_t N_3 \partial_t \phi + \kappa \partial_{x0} N_3 \partial_{x0} \phi + \kappa \partial_{x1} N_3 \partial_{x1} \phi) \int_\Omega N\{0\} + (\int_\Omega N\{2\}) C_1\phi_3 +$$
$$(\int_\Omega N\{1,1\}) (C_1\phi_1 + C_1\phi_2 + C_1\phi_4) + (\int_\Omega N\{2\}) (\partial_t \phi b_1 + \partial_{x0} \phi d_{1,0} + \partial_{x1} \phi d_{1,1}).$$
$$(\kappa t \partial_t N_4 \partial_t \phi + \kappa \partial_{x0} N_4 \partial_{x0} \phi + \kappa \partial_{x1} N_4 \partial_{x1} \phi) \int_\Omega N\{0\} + (\int_\Omega N\{1,1\}) (C_1\phi_1 + C_1\phi_2 + C_1\phi_3) +$$
$$(\int_\Omega N\{2\}) C_1\phi_4 + (\int_\Omega N\{1\}) (\partial_t \phi b_1 + \partial_{x0} \phi d_{1,0} + \partial_{x1} \phi d_{1,1})\}$$

FIG. 2

```
double[] qi = m_WSqi40.get();
qi[5]=-N1[t]+N3[t];
qi[7]=-N1[x1]+N4[x1];
qi[4]=-N1[x1]+N3[x1];
qi[8]=-N1[t]+N4[t];
qi[9]=-(qi[5]*qi[7]+qi[4]*qi[8];
qi[0]=-N1[x0]+N2[x0];
qi[3]=-N1[x0]+N3[x0];
qi[2]=-N1[t]+N2[t];
qi[1]=-N1[x1]+N2[x1];
qi[10]=qi[2]*qi[7]-qi[1]*qi[8];
qi[6]=-N1[x0]+N4[x0];
qi[11]=-(qi[2]*qi[4])+qi[1]*qi[5];
qi[18]=qi[0]*qi[9]+qi[3]*qi[10]*qi[6]*qi[11];
qi[19]=1/qi[18];
qi[20]=qi[9]*qi[19];
qi[12]=qi[5]*qi[6]-qi[3]*qi[8];
qi[21]=qi[12]*qi[19];
qi[15]=-(qi[4]*qi[6])+qi[3]*qi[7];
qi[22]=qi[15]*qi[19];
qi[23]=qi[10]*qi[19];
qi[13]=-(qi[2]*qi[6])+qi[0]*qi[8];
qi[24]=qi[13]*qi[19];
qi[16]=qi[1]*qi[6]-qi[0]*qi[7];
qi[25]=qi[16]*qi[19];
qi[26]=qi[11]*qi[19];
qi[14]=qi[2]*qi[3]-qi[0]*qi[5];
qi[27]=qi[14]*qi[19];
qi[17]=-(qi[1]*qi[3])+qi[0]*qi[4];
qi[28]=qi[17]*qi[19];
qi[29]=-qi[20]-qi[23]-qi[26];
qi[30]=-qi[21]-qi[24]-qi[27];
qi[31]=-qi[22]-qi[25]-qi[28];
qi[32]=N2[Phi]*qi[22]+N3[Phi]*qi[25]+N4[Phi]*qi[28]+N1[Phi]*qi[31];
qi[33]=N2[Phi]*qi[20]+N3[Phi]*qi[23]+N4[Phi]*qi[26]+N1[Phi]*qi[29];
qi[34]=N2[Phi]*qi[21]+N3[Phi]*qi[24]+N4[Phi]*qi[27]+N1[Phi]*qi[30];
qi[35]=0.166666666666667*Math.abs(qi[18]);
qi[36]=qi[35];
qi[37]=0.250000000000000*qi[35];
qi[38]=0.100000000000000*qi[35];
qi[39]=0.050000000000000*qi[35];
```

FIG. 3A

```
        double[] o = m_WSo9.get();
        o[0]=pspace.m_globalValues[b_1]*qi[32];
        o[1]=pspace.m_globalValues[d_1_0]*qi[33];
        o[2]=pspace.m_globalValues[d_1_1]*qi[34];
        o[3]=o[0]+o[1]+o[2];
        o[4]=o[3]*qi[37];
        o[5]=N2[Phi]*pspace.m_globalValues[c_1];
        o[6]=N3[Phi]*pspace.m_globalValues[c_1];
        o[7]=N4[Phi]*pspace.m_globalValues[c_1];
        o[8]=N1[Phi]*pspace.m_globalValues[c_1];
         \
    RV[EQ_Phi_1]=o[4]+(pspace.m_globalValues[Kappat]*qi[31]*qi[32]+pspace.m_g\
      lobalValues[Kappa]*qi[29]*qi[33]+
  pspace.m_globalValues[Kappa]*qi[30]*qi[34])*qi[36]+N1[Phi]*pspace.m_globalV\
      alues[c_1]*qi[38]+(o[5]+o[6]+o[7])*qi[39];
         \
    RV[EQ_Phi_2]=o[4]+(pspace.m_globalValues[Kappat]*qi[22]*qi[32]+pspace.m_g\
      lobalValues[Kappa]*qi[20]*qi[33]+
  pspace.m_globalValues[Kappa]*qi[21]*qi[34])*qi[36]+N2[Phi]*pspace.m_globalV\
      alues[c_1]*qi[38]+(o[6]+o[7]+o[8])*qi[39];
         \
    RV[EQ_Phi_3]=o[4]+(pspace.m_globalValues[Kappat]*qi[25]*qi[32]+pspace.m_g\
      lobalValues[Kappa]*qi[23]*qi[33]+
  pspace.m_globalValues[Kappa]*qi[24]*qi[34])*qi[36]+N3[Phi]*pspace.m_globalV\
      alues[c_1]*qi[38]+(o[5]+o[7]+o[8])*qi[39];
         \
    RV[EQ_Phi_4]=o[4]+(pspace.m_globalValues[Kappat]*qi[28]*qi[32]+pspace.m_g\
      lobalValues[Kappa]*qi[26]*qi[33]+
  pspace.m_globalValues[Kappa]*qi[27]*qi[34])*qi[36]+N4[Phi]*pspace.m_globalV\
      alues[c_1]*qi[38]+(o[5]+o[6]+o[8])*qi[39];
```

METHOD AND SYSTEM FOR GENERATING SOFTWARE CODE USING A SYMBOLIC LANGUAGE TRANSLATOR

TECHNICAL FIELD OF THE INVENTION

This invention relates generally to methods and systems for modeling physical systems using Finite Element problem analysis and, more specifically, to methods and systems for creating a Finite Element simulator for modeling fluid flow in porous media. Even more particularly, this invention relates to methods and systems for generating software code using a symbolic language translator.

BACKGROUND OF THE INVENTION

Mathematical models to simulate the behavior of physical systems can be both time consuming and complex to create. In particular, Finite Element problems in multiple dimensions (for example, the four dimensions of space and time) are almost intractable for humans. These types of problems are so complex that the analysis becomes too difficult for humans to do without error. As the number of dimensions that the problem encompasses increases, the problem itself becomes almost exponentially more difficult in terms of both the actual computations and the difficulty of the computations that must be performed. One method of dealing with the problem of the intractability of multiple-dimension Finite Element problems is symbolic manipulation. Symbolic manipulation involves the translation of mathematical formulas into a symbolic representation that can be used to generate programming code for use in a simulator to model a physical system.

However, currently existing methods of symbolic manipulation are prone to error due to their dependence on a human formulation of the necessary mathematical equations and the translation of those equations into programming code. Human errors can occur in at least two areas. One area is the algebraic calculations, where errors such as dropping of signs or transcription errors can occur. Another area where human error can occur is in the translation of the algebra into code in a programming language such as Fortran, C++, or some other high-level programming language.

Furthermore, even assuming that the person performing the translation of algebraic formulas into programming language code performs the translation 100% correctly, the resulting code may still not be as efficient or concise as desired. For example, the code may be slow, it may be overly large and complex, or it may contain more floating point operations than are necessary.

More importantly, currently existing methods and systems for creating simulators to model physical systems require a large amount of human capital in the form of skilled analysts who must be both conversant with high level mathematics to generate the complex equations needed, and who are also skilled programmers to generate the necessary code from the mathematical formulations. Alternatively, it would take teams of specialized mathematicians and programmers to analyze the problems, formulate the mathematical equations and write the corresponding code. It is both expensive and time consuming to either find people who are skilled in both these aspects, or in having to increase the number of personnel needed to solve such problems by having separate analysts and programmers.

Similarly, research in the area of Finite Element problem analysis has been both difficult and slow, because it takes months or even years to take a new Finite Element method or a new physics and perform all the work necessary to prove that the method or physics are viable. As a result, it has been very expensive and not always feasible in an economically viable amount of time to generate new simulators to model physical systems.

SUMMARY OF THE INVENTION

Therefore, a need exists for a method and system for generating software code using a symbolic language translator that can efficiently solve multi-dimensional Finite Element problems that are too intractable for humans to solve, such as generating simulators for modeling fluid flow in porous media, and which reduce the intensive computer time necessary to solve such problems.

A further need exists for a method and system for generating software code using a symbolic language translator that significantly reduces or eliminates the propensity for human error inherent to the manipulation of complex mathematical formulas and to the translation of those mathematical formulas into a programming language code.

A still further need exists for a method and system for generating software code using a symbolic language translator that significantly improves the performance of the programming code generated from the symbolic translation of mathematical formula that are solved to create a model of a physical system. The performance of the code generated from such a method and system can have increased speed, less complexity, and a lesser number of floating point operations.

An even further need exists for a method and system for generating software code using a symbolic language translator that provides for rapid prototyping by improving the development process for a simulator for generating a mathematical model of a physical system, such as the fluid flow in a porous media. Such a method and system would make it possible to generate the simulator in an economically viable amount of time.

Even further, a need exists for a method and system for generating software code using a symbolic language translator that significantly reduces the dependency of prior such systems on specialized personnel such as analysts/ programmers that had to be conversant in both the mathematics of the physical modeling process and have the programming skill necessary to translate the mathematics into programming code.

Still further, a need exists for a method and system for generating software code using a symbolic language translator that provides the capability to decrease research turnaround time by providing a means for generating a new simulator from either a new Finite Element method or using a new physics in a shorter period of time than the current such methods and systems.

In accordance with the present invention, a method and system for generating software code using a symbolic language translator is provided that substantially eliminates or reduces the disadvantages and problems associated with previously developed such systems and methods. In particular, the present invention provides an improved method and system for creating on a computer a native operators and test code file for a finite element simulator to model fluid flow in porous media. The method of the present invention includes the steps of inputting into a symbolic language translator equations and parameters describing the model to be created by the simulator and generating one or more model objects from the equations and parameters. The method of the present invention further includes the steps of generating a symbolic representation of the residual and tangent matrix operators of the model objects and generating optimization rules for any geometric invariant quantities. Numeric core code and data structure initializing core code are generated for the simulator in a high level programming language from the language of the symbolic language translator. The numeric core code is formatted and optimized and a file is generated containing the formatted and optimized numeric core code and the data structure initializing core code.

The present invention provides an important technical advantage by generating software code, using a symbolic language translator, that can efficiently solve multi-dimensional Finite Element problems that are too intractable for humans to solve, such as generating simulators for modeling fluid flow in porous media, and which reduce the intensive computer time necessary to solve such problems.

The present invention provides another technical advantage by generating software code using a symbolic language translator that significantly reduces or eliminates the propensity for human error inherent to the manipulation of complex mathematical formulas and to the translation of those mathematical formulas into a programming language code.

The present invention provides yet another technical advantage by generating software code using a symbolic language translator that significantly improves the performance of the programming code generated from the symbolic translation of mathematical formula that are solved to create a model of a physical system. The performance of the code generated from such a method and system can provide increased speed, less complexity, and a lesser number of floating point operations.

The present invention provides yet another technical advantage by generating software code using a symbolic language translator that provides for rapid prototyping by improving the development process for a simulator for generating a mathematical model of a physical system, such as the fluid flow in a porous media. Such a method and system would make it possible to generate the simulator in an economically viable amount of time.

The present invention provides yet another technical advantage by generating software code using a symbolic language translator that significantly reduces the dependency of prior such systems on specialized personnel such as analysts/programmers that had to be conversant in both the mathematics of the physical modeling process and have the programming skill necessary to translate the mathematics into programming code.

The present invention provides yet another technical advantage by generating software code using a symbolic language translator that provides the capability to decrease research turn-around time by providing a means for generating a new simulator from either a new Finite Element method or using a new physics in a shorter period of time than the current such methods and systems.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGUREs, like numerals being used to refer to like and corresponding parts of various drawings.

The present invention provides a method and system for generating software code using a symbolic language translator that is more flexible, more efficient, less prone to error, and much less dependent on people with a very specialized skill set than any such prior art method and system. The present invention solves the intractability problem of multi-dimensional Finite Element problems by providing a simple interface for entering the mathematical equations describing the physical system and providing improved automated symbolic translation and code generation to be modeled. Similarly, the present invention eliminates the propensity for human error in the translation of algebraic equations by automating the algebraic equation input function. Additionally, by providing improved automatic symbolic translation from algebraic equations to programming code, the method and system of the present invention significantly improves the performance of the resulting code and streamlines the development process of simulators for modeling of physical systems. It is therefore possible to generate in an economically viable amount of time new simulators for new physics to model such physical systems. The method and system of the present invention thus provide a rapid prototyping for new Finite Element methods or new physics that can be used to create new simulators for modeling physical systems.

The present invention provides a simple interface for entering the mathematical formulations describing the physics that are to be solved by a simulator to model a physical system, such as a Finite Element simulator for modeling fluid flow in porous media. The present invention relies on the programming language Mathematica, as described in S. Wolfram, "The Mathematica Book," 3d Ed. (Wolfram Media, Cambridge Univ. Press 1996). Mathematica is incorporated into the present invention as a means to effectuate the symbolic manipulation of algebraic formulas into generated code in a programming language such as JAVA, C++ or Fortran.

Figure 1:
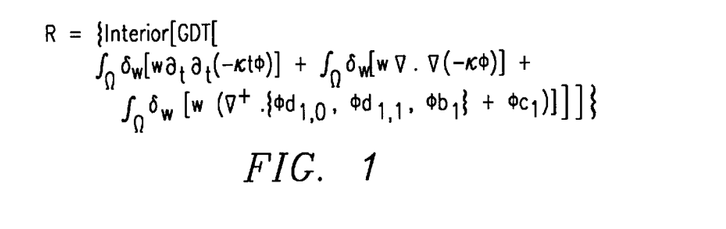
FIG. 1 shows a typical mathematical equation that can be used as input for the present invention.

FIG. 1 shows a typical mathematical equation, much like the equations that can be seen in a typical math text. Mathematical equations such as that shown. in FIG. 1 comprise the inputs generated by a typical analyst that can then be input into the Mathematica program.

Figure 2:
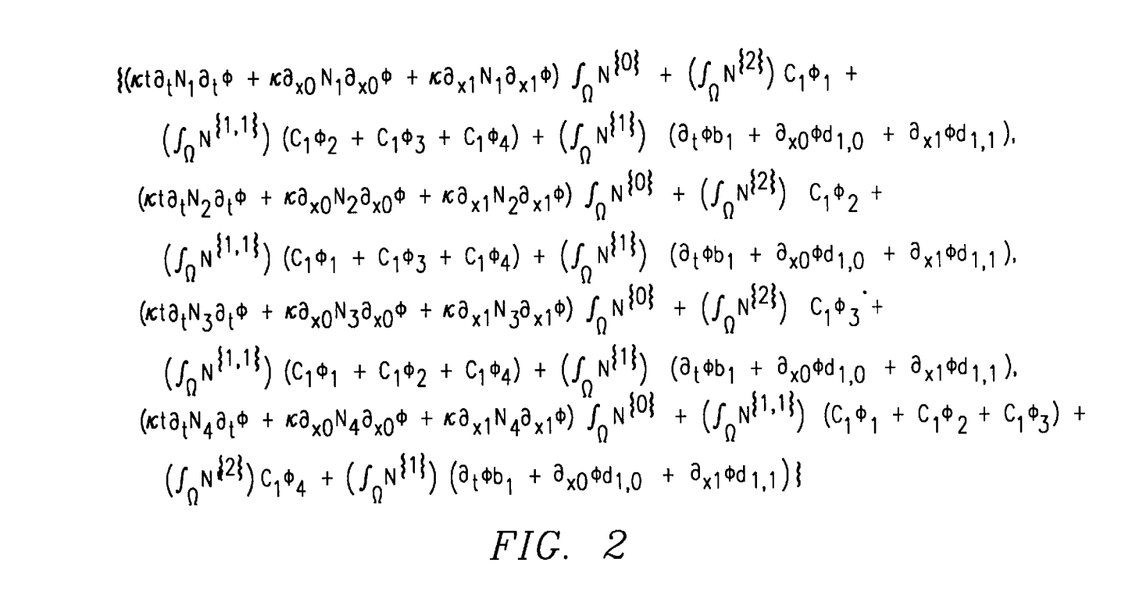
FIG. 2 is an example of the symbolic residual representation of the equation of FIG. 1.

FIG. 2 is an example of the symbolic residual representation corresponding to the equation shown in FIG. 1. In order to apply a Finite Element method to the mathematical equations, such as shown in FIG. 1, the symbolic representations shown in FIG. 2 are typically generated by hand by the analyst who generated the corresponding mathematical equations. In prior art symbolic translation methods and systems, a very skilled analyst is required to effectuate both the generation of the initial mathematical formulations and the symbolic representations shown in FIG. 2 of those mathematical formulations as shown in FIG. 2. The symbolic representations of FIG. 2 represent a typical output from the,Mathematica program.

Figure 3A:
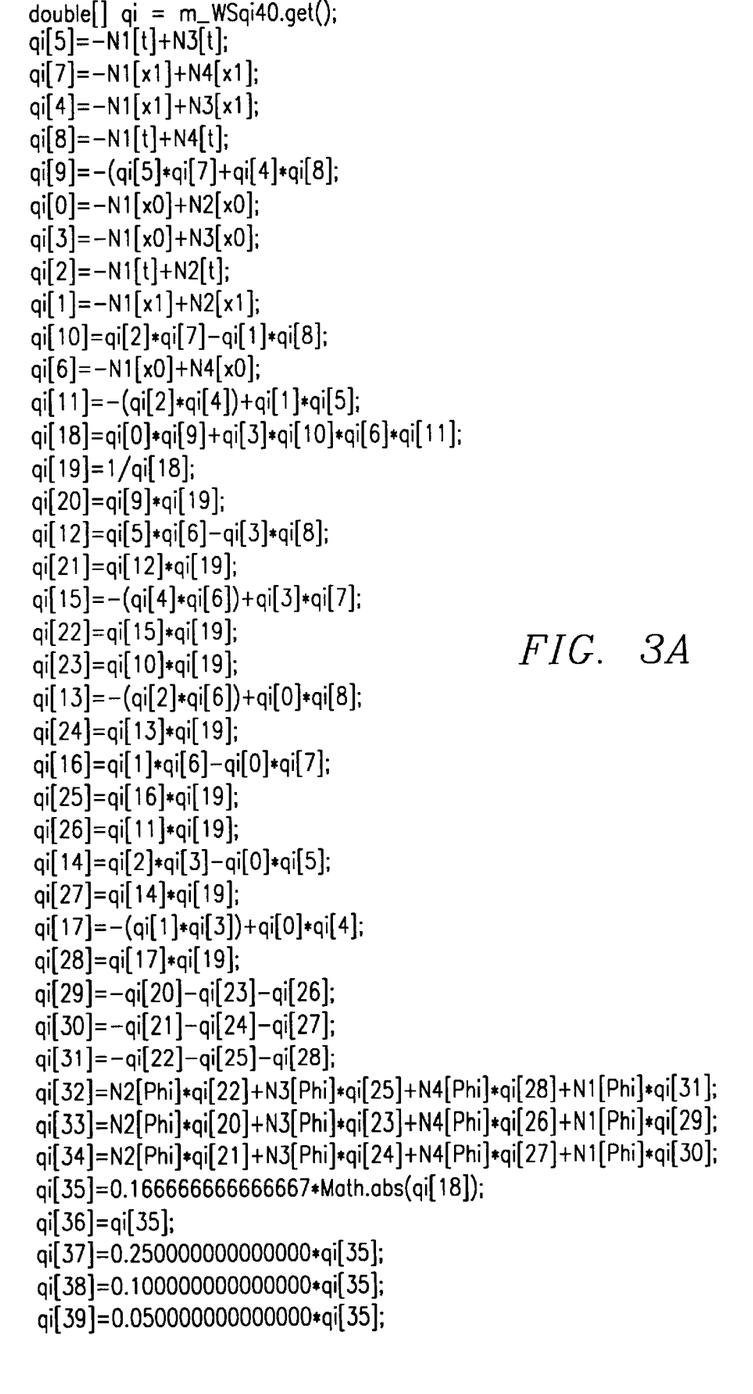
FIGS. 3A and 3B show an example of the source code generated by the present invention from the symbolic representation of FIG. 2.
Figure 3B:
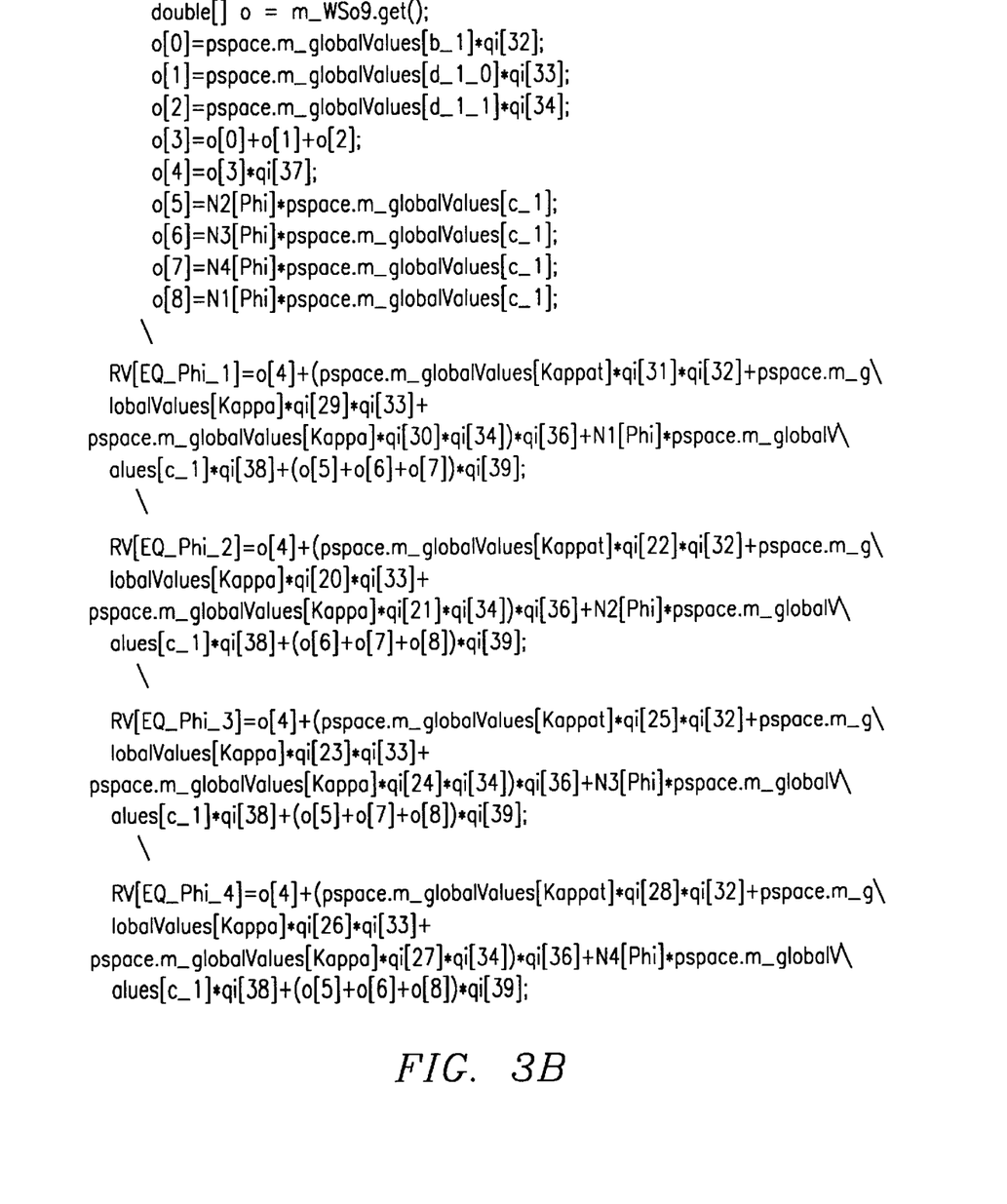

FIGS. 3A and 3B show an example of the source code generated by the Mathematica program from the symbolic representations (FIG. 2) of the mathematical formulations as shown in FIG. 1. In prior art symbolic translation systems, the three stages represented by FIGS. 1, 2 and 3 are performed using high levels of human interaction, with the accompanying propensity for errors. The present invention performs the majority of these functions automatically.

In particular, the translation into symbolic representations of the mathematical formulations generated by an analyst, and the corresponding code generation are performed automatically by Mathematica packages (code modules) of the present invention written specifically for that purpose. The present invention also provides a notational system that allows an analyst generating initial mathematical formulations to enter mathematical notation in exactly the format the analyst would otherwise write out those notations. The analyst can simply click on graphical user interface (GUI) buttons on the computer screen to enter derivatives, integrals and other mathematical symbology. Although the interface of the present invention is not completely button driven, the analyst is freed from the syntax constraints that Mathematica otherwise requires without the additional code modules of the present invention. In other words, the analyst is not only free from having to be an expert programmer in the language in which the generated code will ultimately be outputted, but also free from having to be a skilled Mathematica programmer as well. The present invention thus provides a familiar interface to input mathematical formulations into Mathematica itself.

Figure 4:
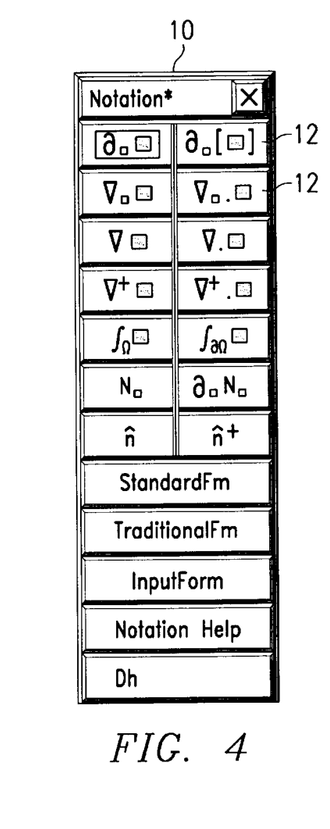
FIG. 4 is a screen shot of the notation palette of the improved Mathematica user interface of the present invention.

FIG. 4 is a screen shot of notation palette 10 of the improved Mathematica user interface of the present invention. The syntax of Mathematica has been extended to include widely used calculus-of-variation notation. Notation palette 10 gives the user a "point-and-click" method of entering complicated mathematical notation, so that the user does not have to be a Mathematica expert to use the system. Notice is taken here that, in general, palettes are a built-in programming feature of Mathematica. However, improved notation palette 10 of FIG. 4 is a custom programmed module that improves the functionality of Mathematica far beyond its current state.

Notation palette 10 of FIG. 4 provides an analyst the ability to easily enter complex mathematical formulations in the same way that he or she would write them by hand, or as they typically would be seen in a textbook. The analyst thus has additional comfort and familiarity while working with complex mathematical formulas. Analysts are freed from also having to be expert programmers in order to, without the aid of a programmer, efficiently generate a simulator for a model of a physical system.

The present invention thus provides a better interface for an analyst to the Mathematica program. For example, notation palette 10 includes buttons 12 that an analyst can click on to enter complicated notations like integral signs and derivatives, special operations and so forth. Such complex notations no longer have to be manually typed in by the analyst. The method and system for generating software code using a symbolic language translator of the present invention is effectuated in Mathematica code, and so relies on Mathematica for its underlying functionality, but only to the extent that any programming code relies on the programming language in which it is written. For purposes of the present invention, Mathematica is simply a programming language that performs the symbolic manipulation of the present invention. A high-level mathematical description can thus be generated, a finite method analysis applied to that high-level mathematical description, and a resulting programming code generated.

The method and system for generating software code using a symbolic language translator of the present invention includes a number of unique software packages (code modules) written in the Mathematica language. These unique modules interface with various other already-existing Mathematica modules to perform the symbolic manipulation necessary to create a simulator for modeling of, for example, fluid flow in a porous media. The programming code used in the present invention is modular and includes different Mathematica files containing orthogonal pieces of functionality.

Figure 5:
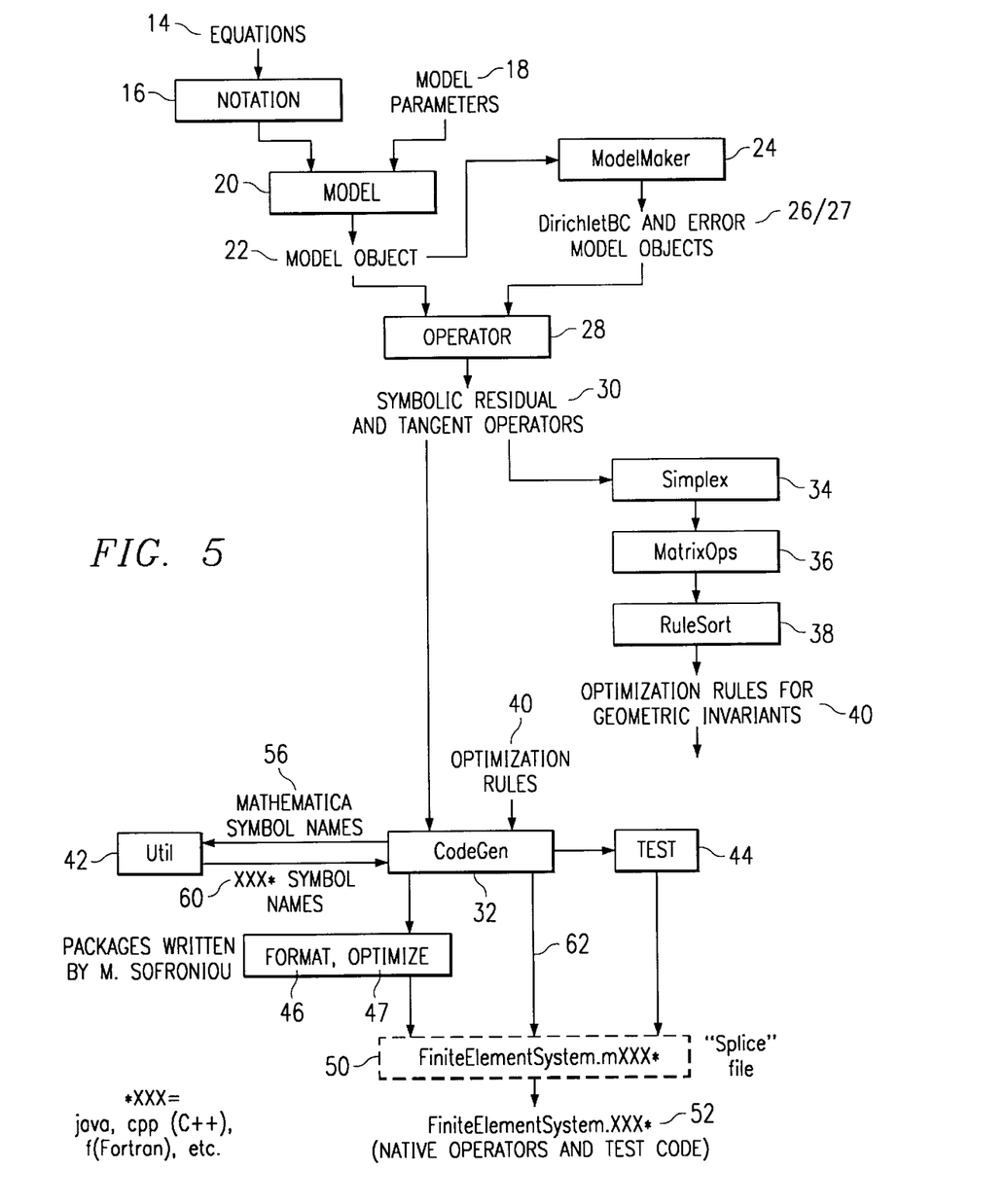
FIG. 5 is a data-flow diagram showing the interrelation and operation of the different modules of the present invention.

FIG. 5 is a data flow diagram showing the inter-relation and operation of the different Mathematica modules of the present invention, both those that are unique to the present invention and those already existing within Mathematica. Notation module 16, Model module 20, Modelmaker module 24, operator module 28, CodeGen module 32, Simplex module 34, Matrixops module 36, RuleSort module 38, Util module 42 and Test module 44 are some of the novel aspects of the present invention.

Equations 14 and model parameters 18 of FIG. 5 are the inputs provided by the user (the analyst). Equations 14 and model parameters 18 represent the variables the analyst is solving for. An example of equations 14 is shown in FIG. 1. Notation module 16 is a functional element of the present invention (the underlying code for notation palette 10 of FIG. 4) that allows the analyst to enter his equations and model parameters into a computer in the proper mathematical symbology with significantly less effort than prior art systems. The analyst accomplishes this through the use of notation palette 10, previously described as part of FIG. 4. Notation module 16 allows the analyst to enter equations 14 into the Mathematica program.

Model module (package) 20 provides a kind of housekeeping function. Model module 20 creates objects called models out of the analyst's parameters and equations. A model is a collection of variables, equations, and other information necessary to construct residual and tangent matrix operators for the given equations 14. Everything that the resulting generated code deals with is given in terms of models or larger objects.

Additionally, Modelmaker module 24 provides as an output the solution to other possible subsystems consisting of equations that the analyst might need in order to estimate the error in the eventual solution to equations 14. Modelmaker module 24 can include a function called "make lagrange model" that takes as an input a model object 22 and outputs as another model the Dirichlet boundary condition 26 for the original model. Similarly, Modelmaker module 24 can include a function called "make error models" that takes as an input a model object 22 and outputs new model objects 27 that estimate the error in the original model. These functions are performed automatically with a single function call; the analyst is not required to code all the different models. Therefore, once the analyst has built a main model, the present invention can automatically create other required models.

Model Module 20 Structure

Several design goals for the Finite Element modeling module 20 of FIG. 5 have led to this structure. It is desirable to allow the analyst to see intermediate, human-readable results of the modeling process before the generation of compiled-language code takes place. The present invention allows the analyst to see intermediate results of the process in the form of model objects 22, 26 and 27. Additionally, the Mathematica splice file can also refer to these intermediate results, for the sake of efficiency. The splice file is further discussed below.

To effectuate these goals, it would appear that certain results have to be kept in global variables. However, this would make working on more than a single model at a time exceedingly difficult and error-prone. Therefore, the method and system of the present invention isolates the set of variables for each model.

This can be done by storing a model's values as Down-Values (functions built into Mathematica), e.g., model[R], model[PU], etc. The special symbols R, PU, etc. are protected in Mathematica and cannot be set by the user. An attempt to set R=5, for example, will result in $Model[R] being set to 5, where $Model is the current model. There are two additional advantages to this design within Mathematica. First, the construct Block[{$Model=othermodel}, expression] effectively changes the current model only for the duration of the Block. This construct is used by the Finite Element 'Operator' package (discussed more fully below) to perform computations with model variables. Second, intercepting all attempts to set model variables enables error-checking to be done very early in the model construction process.

Model Variables

The following model variables are stored with each model:

Inputs

R is the system of partial differential equations for a Finite Element model.

PU is a list of primary unknowns for a Finite Element model. The model must have a SystemSpaceObject (SYS) before PU can be set.

SU is a list of secondary unknowns, with explicit dependencies, for a Finite Element model. The model must have a SystemSpaceObject (SYS) before SU can be set.

EA is a list of element-averaged group variables, with explicit dependencies, for a Finite Element model.

CF is a list of constant fields for a Finite Element model. The model must have a SystemSpaceObject (SYS) before CF can be set.

K is a list of global constant initialization rules for a Finite Element model.

GC is a list of global coordinates for a Finite Element model. It is a read-only model variable (use MakeSystemSpace to set GC indirectly).

PHY is a string identifying the physics type for a Finite Element model. It is a read-only model variable (use MakeNodeSpace to set PHY indirectly).

SYS is the SystemSpaceObject for a Finite Element model.

TOPDIM is the topological dimension of the Simplex for a Finite Element model.

OP is a string identifying the operator name for a Finite Element model. It determines the generated operator's directory name.

OPTYPE should be set to either OpInterior or OpBoundary. (default: OpInterior). It is used by the CodeGen module 32 to select a splice file.

OpInterior and OpBoundary are possible values for the OPTYPE model variable.

EQ is a list of equation identifiers (symbols or subscripted symbols) of the equations in the residual for a Finite Element model.

OBJ is a list of Object[typename, objectname, baseclass] for the Java objects that appear in the SU dependency rules.

Object[t, o, "bc"] specifies a Java object of type t (the generated interface name) derived from base class bc (a string containing a full class path) in the OBJ model variable. Object[t, o, "bc", "init"] initializes the object using the compiled-language code found in init (default: "null").

MAP is a list of rules of the form global_coordinates→[point_Coordinates]. The point coordinates are specified as Point[0], Point[1], etc. It defaults to the model's SystemSpace map.

INITCF, INITPU, FINCF, FINPU, and UPDATE contain a list of method calls and/or assignment rules for external object initialization, updating, or finalization.

BUILDER specifies arguments to a condition builder for the model. It should be a string or a (possibly nested) list of strings, all at the same depth. Examples include: "Operator", "WellPostCondition", {{"DirichletCondition"}, {strings . . . }}. The default value is " " (no condition builder).

OPGEN specifies the operators for which to generate code. It can be a list of zero or more of the keywords ResidualVector, TangentMatrix, TangentAdjointMatrix, TangentImage, and TangentAdjointImage, or the keyword All. It defaults to All.

ResidualVector, TangentMatrix, TangentAdjointMatrix, TangentImage, and TangentAdjointImage are operator keywords.

CACHE is a model variable specifying the maximum number of element-geometric quantities to cache in each ElementSystem object. CACHE may be set to any nonnegative integer or the symbol Infinity.

Outputs

SSU is a list of secondary unknowns and derivatives of secondary unknowns that are stored in the NodeSpace. It is a read-only model variable.

CSU is a list of computed secondary unknowns (secondary unknowns or derivatives of secondary unknowns that are NOT stored in the NodeSpace). It is a read-only model variable.

ZSU is a list of secondary unknowns (or their derivatives) that are identically zero. It is a read-only model variable.

RI is the cached value of the interior component of the discrete residual. It is a read-only model variable.

RB is the cached value of the boundary component of the discrete residual. It is a read-only-model variable.

TI is the cached value of the interior component of the discrete tangent. It is a read-only model variable. TI is cleared each time Residual[ ] is called. If TI is undefined at code-generation time, no tangent operator is generated.

TB is the cached value of the boundary component of the discrete tangent. It is a read-only model variable. TB is cleared each time Residual[ ] is called. If TB is undefined at code-generation time, no tangent operator is generated.

DIM[model] returns the spatial dimension of a Finite Element model. DIM[ ] is equivalent to DIM[$Model].

NS is the NodeSpaceObject for a Finite Element model. It is a read-only model variable, determined indirectly by SYS.

ObjectTypes[ ] returns a list of external object types referenced by the current Finite Element model.

Objectinstances[pattern] returns a list of instances of all external objects in the current Finite ElementModel whose class name matches pattern.

Functions for Creating, Destroying, and Querying Properties of Models

BeginModel[model] makes model the active model, so that references to model[R], model[PU], etc. can be abbreviated R, PU, etc. It returns the set of model values for the newly active model.

EndModel[ ] deactivates the active model, reactivates the previously active model, and returns the set of model values for the newly active model. The deactivated model's values can still be accessed using the syntax model[R], model[PU], etc.

$Model evaluates to the active model.

DefaultModel is the default Finite Element model, active when there is no user-defined active model.

ClearModel[model] returns all of model's values to their defaults.

CopyModel[model1,model2] clears model2, copies the inputs of model into model2 and sets the current model to model2.

$ModelStack returns the model stack.

ModelValues[model] returns the values defined for a model, expressed as a list of rules. ModelValues[ ] returns the values for the active model.

ModelQ[x] returns True if x is a Finite Element model, False otherwise.

ModelValueQ[x] returns True if x is a model variable and a value has been assigned to x in the active model.

Returning now to FIG. 5, model objects 22, Dirichlet BC model object 26, and Error model object 27 (all the models) are sent to Operator module 28, which performs most of the mathematical manipulations. Operator module 28 takes as an input a model object (either model object 22, Dirichlet BC model object 26, or Error model object 27) and outputs a symbolic calculation of the residual and tangent matrix operators, Symbolic residual and tangent operators 30.

To output Symbolic residual and tangent operators 30, Operator module 28 at a basic level calculates integrals of mathematical equations 14, which can be functions of several variables. The Mathematica program itself has a built-in "integrate" function that can integrate an equation. However, a Finite Element analysis problem of multiple dimensions can be at a level of complexity that Mathematica may not be able to obtain a solution in a short enough amount of time to make economic sense. Additionally, it is possible to make various simplifications in terms of what portions of the mathematical expressions to input into Mathematica. If this simplification is performed, it is possible to obtain a solution to the equations without using Mathematicals "integrate" function. To perform this equation simplification, those elements of the equations that are constants are sorted out from those elements that are not constants. The calculation is then performed at a different level of instruction. Different properties of the mathematical expressions can thus be used to obtain the answer in a different way. Operator module 28 can thus be used as a means of avoiding explicit integration.

Finite Element operator module 28 constructs a solution to a system of partial differential equations (PDEs) over a domain by partitioning the domain into Simplex elements and combining the solutions to the system on each of the individual Simplex elements.

Simplex

A Simplex is a Euclidean geometric spatial element having the minimum number of boundary points, such as a line segment in one-dimensional (1D) space, a triangle in 2D space, or a tetrahedron in 3D space. Thus, a Simplex of dimension n has n+1 vertices, labeled vertex 1, . . . , vertex n+1. The face opposite vertex i is labeled face i. Each face of a nD Simplex is a (n−1)D Simplex.

Basis Functions, Master Element

Basis functions form a coordinate system for specifying any point in a Simplex as follows: The i-th basis function, $N_i$, specifies the distance of the point from the i-th face of the Simplex, along a line from the i-th face to the i-th vertex. There are n+1 basis functions for a Simplex of dimension n. $N_i$ is defined to be 1 at vertex i and 0 at any point on face i.

The master element in nD is defined as the nD Simplex with one vertex at the origin of a Cartesian coordinate system and the other n vertices at the Cartesian points (1,0,0 . . . 0), (0,1,0 . . . 0), . . . (0,0,0 . . . 1). For example, in 2D the master element (a triangle) has vertices at (0,0), (1,0), and (0, 1).

Labeling the vertices in a counter-clockwise fashion can begin with vertex I at the point (x=1,y=0), then face 1 is the line x=0, face 2 is the line y=0, face 3 is the line x+y=1. For this element, the basis functions are as follows:

$$N_1(x,y)=x$$
$$N_2(x,y)=y \qquad \text{Equation (1)}$$
$$N_3(x,y)=1-x-y$$

Any point inside the Simplex can be specified in terms of the basis functions. For example, the centroid of a triangle is at the point $(N_1, N_2, N_3)=(1/3, 1/3, 1/3)$.

Method of Finite Elements

It is assumed that the variables in a system of partial differential equations vary linearly over the span of each individual Simplex. In other words, on a particular nD Simplex, a variable p(x, y, . . . ) can be rewritten as $$p(x, y, \cdots) = \sum_{i=1}^{n+1} p_i N_i(x, y, \cdots) \qquad \text{Equation (2)}$$

where $p_i$ is the value of p at vertex i of the Simplex. The summation on the right-hand side of Equation (2) is referred to as the discretized form, or discretization, of the variable on the left-hand side. The $p_i$ are called the components of p.

The problem is posed as one or more equations of the form $$\int_\Omega F\left(p(x, y, \cdots), q(x, y, \cdots), \cdots, \frac{\partial p(x, y, \cdots)}{\partial x}, \frac{\partial^2 p(x, y, \cdots)}{\partial x^2}, \cdots\right) d\Omega = 0 \qquad \text{Equation (3)}$$

The integral on the left-hand side of Equation (3) is called the continuous residual. The goal is to solve for values of p, q, ... (the primary unknowns) that make the residual equal to 0. There are two ways to calculate the value of the residual:

1. Numerical Quadrature. This technique approximates the value of the integral on each Simplex with a weighted sum of the integrand evaluated at carefully-chosen points on the Simplex. The drawback of this method is the necessity of calculating the value of the integrand at enough quadrature points to get the desired numerical accuracy.

2. Exact symbolic integration. Once the integral has been calculated symbolically, the cost of numerically evaluating the integral can be much smaller than it is using quadrature. However, the symbolic calculation involved in the exact integration of Equation (3) on higher-dimensional simplices is intractable when done by hand. The purpose of Finite Element 'Operator' module 28 is to perform this symbolic calculation.

Calculation of the Discrete Residual

The discrete residual is obtained by discretizing each of the unknowns in Equation (3) using the relationship of Equation (2). This can be accomplished in Mathematica by using the built-in function ReplaceAll. This transforms the left hand side of Equation (3) into $$\int_\Omega G\left(p_1, p_2, \cdots, q_1, q_2, \cdots, N_1(x, y, \cdots), N_2(x, y, \cdots), \cdots, \frac{\partial N_1}{\partial x}, \frac{\partial N_2}{\partial x}, \cdots\right) d\Omega \qquad \text{Equation (4)}$$

Theoretically, this integral can be evaluated by replacing the basis functions with their equivalent expressions in terms of the Cartesian coordinates (as in Equation (1), but for arbitrary dimensions), and performing a transformation of variables to the Cartesian coordinates to yield $$\int_0^1 \int_0^{1-x} \cdots \int_0^{1-x-y-\cdots} G\left(p_1, p_2, \cdots, q_1, q_2, \cdots, x, y, \cdots, \frac{\partial N_1}{\partial x}, \frac{\partial N_2}{\partial x}, \cdots\right) \Im d \cdots dy dx \qquad \text{Equation (5)}$$

where $\Im$ is the simplex Jacobian. However, for even modest-sized problems the evaluation of Equation (5) by a computer algebra system on a modern computer workstation requires days of computation time and hundreds to thousands of megabytes of random-access memory.

Operator module 28 of the present invention takes a different approach. Since the components $p_i$, $q_i$, etc. and the derivatives of the basis functions are constant over any particular Simplex, Equation (4) can be rewritten as, This transformation is virtually impossible to perform without a computer, but even for large problems in four dimensions, a computer algebra system running on a modern workstation can perform it in only a few minutes. Using the method of the present invention, this transformation can be performed using the built-in function ExpandAll, followed by several applications of the built-in function Collect to simplify the resulting expression.

The integrals in Equation (6) can be evaluated efficiently using the formula $$\int_\Omega \prod_{j=1}^{n+1} (N_j(x, y, \cdots))^{i_j} d\Omega = \frac{\prod_{j=1}^{n+1} i_j!}{\left(n + \sum_{j=1}^{n+1} i_j\right)!} \cdot \text{Volume}(\Omega) \qquad \text{Equation (7)}$$

Substituting Equation (7) into Equation (6) yields a formula for the exact integral of the discrete approximation to the continuous residual over a Simplex, called the discrete residual.

Note that the value of Equation (7) is invariant under permutation of the exponents on the basis functions; therefore, each of the integrals in Equation (6) can be replaced by an equivalent integral whose exponents appear in sorted order. This greatly reduces the number of evaluations of Equation (7) that are required.

When the continuous residual contains an integral over the boundary of a Simplex, then a single continuous residual gives rise to n+1 discrete residuals, one for each face of the Simplex. The fact that $N_i$ is zero on face i affords the opportunity to simplify the face-specific discrete residuals.

Class of Supported Operations and Operands within Operator Module 28

Finite Element Operator module 28 allows continuous residuals to be expressed in terms of any or all of the following:

1. Primary unknowns, secondary unknowns (i.e., functions of primary unknowns), and constant fields, which are assumed to have values defined at each of the vertices of a $$\sum_{i_j} \cdots \sum_{i_{n+1}} G_{i_j \cdots i_{n+1}}\left(p_1, p_2, \cdots, q_1, q_2, \cdots, x, y, \cdots, \frac{\partial N_1}{\partial x}, \frac{\partial N_2}{\partial x}, \cdots\right) \int_\Omega \prod_{j=1}^{n+1} (N_j(x, y, \cdots))^{i_j} d\Omega \qquad \text{Eqn. (6)}$$

Simplex and can be expanded using Equation (2). These quantities can be user-defined.

2. Element-averaged unknowns, which represent a function of any of the quantities listed in 1 above, evaluated at the centroid of the simplex. These quantities can be user-defined.

3. Cartesian coordinates x, y, . . . These can be user-defined.

4. First and second derivatives of primary, secondary, or element-averaged unknowns with respect to any of the Cartesian coordinates. Because the differential operators in Mathematica, in general, evaluate immediately, it is necessary to implement analogous operators that represent these operators, but that do not evaluate, so that they can be manipulated by high-level transformations such as the Gauss Divergence Theorem. The function Dh is defined to represent these derivatives.

5. Other coordinate-based differential operators of the unknowns, such as Divergence and Gradient. The same comments apply to these operators as apply in item 4 above. The functions GradS, GradST, Gradh, DivS, DivST, and Divh represent these operations.

6. Variation of an expression with respect to an arbitrary variable or set of variables. The function Variationh represents this operation.

7. Basis functions and derivatives of basis functions with respect to the Cartesian coordinates. The functions BasisFunction and BasisDerivative represent these quantities.

8. The normal vector to any face of the Simplex. The function FaceNormal represents these quantities.

9. Integration over the interior or the boundary of a Simplex. The functions IntegrateInterior and Integrateboundary represent these operations.

10. Application of the Gauss Divergence Theorem to integrals containing differential operators. The function GDT represents this operation.

Although any of the quantities and operations listed in items 4–9 above can be entered directly by the user, e.g., Integrateinterior[Variationh[w*Dh[p,x],w]], this is not a natural way of entering these quantities for the target users of this invention. Special syntax for entering items 4–9 that is familiar to the target users (e.g., $\int_\Omega \delta_w[w\partial_x p]$ for the example just given) can be implemented using notation module 16, discussed above.

Optimization of Discrete Operators for Numerical Calculation

Although in theory, substituting Equation (7) into Equation (6) yields a formula for the discrete residual, in practice, we do not perform this substitution until after Equation (7) has been evaluated numerically (once for each unique sorted set of exponents) in the generated code. This minimizes the number of times that Equation (7) needs to be evaluated, making the generated code much more efficient.

Other commonly-appearing expressions that are optimized in this way are the derivatives of the basis functions and normal vectors to the Simplex faces. These quantities are calculated by the Finite Element Simplex module 34, as shown in FIG. 5.

These calculations involve matrix determinants and inversion of symmetric matrices, both of which contain a high degree of redundancy. In order to identify the maximum possible number of common subexpressions, the matrix calculations are done by the Finite Element MatrixOps module 36 rather than using built-in Mathematica functions such as Det and Inverse.

In addition, values of secondary unknowns or element-averaged unknowns, and their derivatives, are not substituted until numerical evaluation is performed in the generated code. The user specifies only the functional forms of these unknowns and Operator module 28 automatically calculates any derivatives of these functional forms that arise during the operator calculations.

The Operator module 28 function IntegralRules scans an operator expression for occurrences of these types of expressions and constructs Rule objects containing their symbolic values. IntegralRules is called by Finite Element CodeGen module 32, where the rules are converted into generated assignments to temporary variables, and by the Finite Element Test module 44, where the rules are used together with the Mathematica ReplaceAll function to numerically evaluate the operator.

Returning now to FIG. 5, symbolic residual and tangent operators 30 that are output from operator module 28 are forwarded to CodeGen module 32. CodeGen module 32 can perform the translation of equations 14 and model parameters 18 from the Mathematica language into program code in JAVA, C++ or Fortran, or some other high-level computer language. In addition, Simplex module 34, MatrixOps module 36, and RuleSort module 38 are available to calculate optimization rules for various quantities that are invariant except for the geometry. In other words, given the coordinates of, for example, a triangle, Simplex module 34, Matrixops module 36 and RuleSort model 38 can together compute various geometric quantities like volume, various rates of change across the face of the construct, etc. These sorts of quantities occur repeatedly and can result in increased computational time and power. To avoid this, the method and system for generating software code using a symbolic language translator of the present invention pre-calculates these various parameters, as previously discussed, so that once the code is generated, each of them need only be calculated once.

Finite Element CodeGen module 32 of FIG. 5 defines a number of functions that produce "snippets" of generated code, that do not by themselves constitute a compilable program module. Instead, these pieces of code are inserted into a text file that contains all of the necessary surrounding declarations, syntax, etc. to form a compilable program module. This is accomplished using the Mathematica Splice command and a number of external files called splice files. As explained in the Mathematica documentation:

"Splice["file"] splices Mathematica output into an external file. It takes text. enclosed between <* and *> in the file, evaluates the text as Mathematica input, and replaces the text with the resulting Mathematica output. Text in the input file not enclosed between <* and *> is copied without change to the output file. Splice ["file"] takes files with names of the form name.mx and writes output in files with names name.x."

For example, a simple Java-language splice file appears below:
public class SpliceExample{
   public static void main(String[ ] args){
      System.out.println("The cosine of the square root of 2 is"+<*Cos[Sqrt[2.]]*>);}};

If this file is given the name SpliceExample.mjava and the command Splice["SpliceExample.mjava"] is issued to Mathematica, then the file SpliceExample.java will be created, whose contents are shown below:
public class SpliceExample{
   public static void main(String[ ] args){

System.out.println("The cosine of the square root of 2 is"+0.155944);}};

This file can be compiled by a Java bytecode compiler to produce an executable Java class file.

The Format and Optimize Packages (Prior Art)

Mathematica Format module 46 and Optimize module 47, as shown in FIG. 5 are available on the World-Wide Web at the Mathsource Web site (mathsource.com). These modules can be found at the pages/Content/Enhancements/Interfacing/Other/0205-254 and/Content/Enhancements/Language/0206-592.

Format module 46 translates a limited class of Mathematica expressions into C, Fortran, or Maple (a small amount of post-processing turns the C output of the Format module function CAssign into syntactically-correct Java code.) The class of expressions that Format module 46 handles are arithmetic operations, most of the elementary functions, and assignments to variables. The chief limitations of Format module 46 are that it does not generate variable declarations or control-flow statements (e.g., if-then-else statements, loops, etc.)

Optimize module 47 attempts to eliminate common subexpressions from a Mathematica expression by syntactic examination. Optimize module 47 and Format module 46 work hand-in-hand so that the code generated by Format CAssign contains assignments to optimization variables that are computed by Optimize module 47. A simple example follows:

CAssign[x, Cos[a+b]+Sin[a+b], AssignOptimize→True]

o1=a+b;

x=cos(o1)+sin(o1);

As mentioned, FormatCAssign does not generate the declarations for these optimization variables.

The following example illustrates an important limitation of Optimize:

CAssign[x, Cos[a+b]+Sin[a+b+c], AssignOptimize→True]

x=cos(a+b)+sin(a+b+c);

Although a+b is a subexpression of a+b+c, Optimize module 47 does not discover this. The problem is not a limitation of the particular implementation of Optimize module 47, but rather a fundamental limitation of syntax-driven expression optimization. There are four different non-trivial subexpressions of a+b+c: a+b, a+c, b+c, a+b+c. For any associative operator with n arguments (e.g., addition, multiplication), there are $2^n-n-1$ possible subexpressions, not counting the trivial subexpressions consisting of a single argument. The number of subexpressions thus becomes intractably large for even modest values of n.

CodeGen Module 32

The present invention uses Format module 46 to translate a sequential numerical computation with no branching, such as a discrete residual operator. It also uses this module to generate code for optimization rules that are computed by the Operator module 28 function IntegralRules. In both of these cases, the generated code consists simply of a list of assignment statements with simple arithmetic operations on their right-hand sides. CodeGen module 32 adds declarations for the appropriate temporary variables to the generated code.

In contrast to this optimization code generation, the present invention can also generate code "from scratch" to initialize a variety of data structures that are used by the simulation engine and the user interface of the simulator. It also can generate code to allow the generated operators to call functions in other, hand-written, code modules.

CodeGen Module 32 Operator Generation

As previously mentioned, the discrete residual and tangent matrix operators contain many common subexpressions that are known in advance, such as geometric invariants (Simplex volumes, basis function derivatives, basis function integrals, normal vectors to Simplex faces) and user-defined unknowns (secondary unknowns, element-averaged unknowns). CodeGen module 32 calls the Operator Module 28 function IntegralRules to create a list of optimization rules for the geometric invariants. Optionally, the costs of computing these subexpressions is calculated, and rules are generated to cache the most expensive such sub-expressions in a data structure. CodeGen module 32 can compute the set of user-defined unknowns, and their derivatives, that are necessary to evaluate the operator under consideration. The two sets of rules are combined and run through Optimize module 47 to perform general purpose optimization. Format module 46 is used to generate the code to evaluate the optimization rules and the operator itself. Finally, appropriate declarations of temporary variables are prepended to the code and the code is spliced into splice file 50 to create output file 52.

There are certain common subexpressions that arise during the process of computing derivatives of user-defined unknowns that the optimizer is unable to detect. As discussed earlier, this is a fundamental limit of syntax-driven expression optimization. Fortunately, knowing something about the properties of derivatives, these expressions can be optimized. These expression arise when a product of several terms is differentiated using the well-known chain rule. In an expression such as $$\frac{\partial (abf(x)g(y)h(x, y))}{\partial x} = abg(y)h(x, y)f'(x) + abf(x)g(y)h^{(1,0)}(x, y)$$

$$\frac{\partial (abf(x)g(y)h(x, y))}{\partial y} = abf(x)h(x, y)g'(y) + abf(x)g(y)h^{(0,1)}(x, y)$$

Equation (8)

we know before the derivatives are calculated that the subexpression ab will occur in every term of every derivative, since it is independent of all variables; that abf(x) will occur in every term of every derivatives with respect to y, since it is independent of y; and so forth. Thus, the expressions on the right-hand sides of Equation (8) can be optimized by examination of the much simpler expressions on the left-hand sides. This is an example of semantic, as opposed to syntactic, optimization, for it relies on the semantics of the differentiation operator.

If test code generation is enabled, CodeGen module 32 can create several sets of test input values for the operator (some predetermined and some random), and invoke the Finite Element Test module 44 to calculate numerical values for the operator based-on these input values. Both the input values and the calculated output values are spliced into another part of splice file 50. The actual code that performs the test is a static (unchanging) portion of splice file 50. When the generated file 52 is compiled and run, the static test code feeds the generated input values into the generated operator code to calculate the outputs, and compares those to the generated output values.

Util module 42 of FIG. 5 translates what constitutes a valid Mathematica symbol name into valid symbol names in the computer programming language in which the code will be generated, such as JAVA, C++ or Fortran. The conventions for what makes a valid symbolic name in Mathematica can be different conventions from what make a valid symbolic name in a programming language such as JAVA or C++. Util module 42 translates between Mathematica and the end product programming language and returns those symbol names to CodeGen module 32.

As discussed more fully above, following CodeGen module 32, Format module 46 and Optimize module 47 perform a portion of the code translation. Format module 46 and Optimize module 47 are prior art modules written by Mark Sofroniou, as discussed above.

A portion of the code generated by CodeGen module 32 does not go through Format module 46 or Optimize module 47. Instead, it passes through to splice file 50. The portion of the code coming out of CodeGen module 32 and going into splice file 50 is represented by arrow 62. Code 62 is generated to initialize various kinds of data structures, as opposed to doing the actual numerical computation. Thus, as discussed previously, numerical code can be generated by Format module 46 and Optimize module 47 and the code for initializing of data structure can be generated directly by CodeGen module 32.

Output from CodeGen module 32 can also be passed to test module 44. Test module 44 can take a symbolic operator and a set of inputs for that operator to calculate what the outputs for that operator ought to be. Both the inputs and the outputs are written into the final programming language code as discussed earlier. Test module 44 receive code from CodeGen module 32 that instructs it to call up an operator, plug in a particular input, see if the inputs match the expected input, and if they don't, print an error message. Test module 44 can serve as a test apparatus for the method and system for generating software code using a symbolic language translator of this invention.

Splice file 50 is an input to the Splice mechanism created by the designers of Mathematica. Its function has been previously described in an earlier portion of this document. The result of running splice file 50 through the Mathematica program is a file containing the same file name, but without the "m" addition to the suffix. This file is shown in FIG. 5 as native operators and test code 52. Native operators and test code 52 represents the final programming code generated by the method and system for generating software code using a symbolic language translator of this invention.

Returning now to Simplex, MatrixOps, and RuleSort modules 34, 36 and 38, these modules are based on a mathematical construction of a Simplex, as described above. Various kinds of matrix operations must be performed to calculate geometric variables of a construct such as, for example, a tetrahedron. The output from Simplex module 34 and Matrixops module 36 are equations for calculating the volumes and so forth of the geometric construct. These equations are sorted such that when they are written into the resulting code and the program is run, they are evaluated in the correct order. For example, if the code contains an equation such as A=B+C and then later an equation $D=A^2$, these equations must be presented in the correct order. This function is performed by RuleSort module 38. RuleSort module 38 can incorporate an algorithm called "topological sort" which is well known in the literature.

CodeGen module 32 of FIG. 5 can also generate code to evaluate the operators inputted into the system. The data structures that are generated as part of the method of the present invention are used to effectuate the generation of code by CodeGen module 32 that is then forwarded to Format module 46 and Optimize module 47. CodeGen module 32 takes as an input symbolic residual and tangent operators 30 and generates code to evaluate those operators. To do this, CodeGen module 32 calls upon Simplex module 34, MatrixOps module 36 and RuleSort module 38 to pre-optimize quantities that appear repeatedly in the symbolic residual and tangent operators. In this sense, CodeGen module 32 also can serve as a traffic director among the different modules of the method and system for generating software code using a symbolic language translator of the present invention. Additionally, CodeGen module 32 can set various settings for the Format module 46 and Optimize module 47. In Format module 46 and Optimize module 47 the optimization qualities may be obscured in the course of other algebraic manipulations. This is the reason that pre-optimization is performed by CodeGen module 32 in cooperation with Simplex module 34, MatrixOps module 36 and RuleSort module 38.

Native operators and test code 52 of FIG. 5 represents the output from the method and system for generating software code using a symbolic language translator of the present invention. This is the code that a second set of analysts can use to create a model of a physical system such as fluid flow through porous media. Native operators and test code 52 of FIG. 5 is shown as a single file, however multiple files can be generated to comprise a larger framework of, for example, up to 500 Java files or more, that taken together can be used to simulate the fluid flow in a porous media such as an oil-reservoir. Native operators and test code file 52 can be used together with the user interface of this invention and an additional file called a solver to create models of physical systems.

Native operators and test code 52 represents a general-purpose solution code to a very large linear algebra system used to represent and model fluid flow through porous media (or some other physical system). This general-purpose solution, however, can be used to get a better and better approximation through the use of an iterative solver. By continuously re-evaluating the operators at the last best estimate, new estimates of the solution can be made and fed back into each previous solution such that other values are also better approximated. These new values can then be fed back into the operators to generate new solutions which, in turn, can be fed back again. Native operators and test code file 52 can thus be thought of as a core code that can be re-evaluated continuously by an iterative solver to get a closer and closer approximation to the true solution for a model of a physical system. A final product could thus be presented to a future analyst which consists of the generated core code and a solver file that uses the generated core code. Additionally, a user interface can be used to access the solver and generated core code. Together, they form a simulator for creating models of physical systems.

The method and system for generating software code using a symbolic language translator of this invention therefore provides an analyst with the tools to create a Finite Element method simulator to model a physical system, such as fluid flow through a porous media, in a more efficient, error-free and automatic manner Algebraic errors and translation errors are reduced through the use of the notational palette allowing easy notational input into the Mathematica program. Additionally, by providing a very simplified and intuitive mode of entering complex mathematical formulations, an analyst is not required to be skilled in the art of programming.

The method and system for generating software code using a symbolic language translator of this invention can be used to solve the physical problem of modeling an oil reservoir. This is a four-dimensional problem because three space dimensions and a time dimension are necessary to fully describe an oil reservoir. An oil reservoir is a real-world example of a four-dimensional problem in which the partial differential equations used to describe the system are so complicated that the probability of an error or mistake becomes huge. The method and system for generating software code using a symbolic language translator of this invention allows for the creation of a simulator for modeling this type of system in an economically viable amount of time. An oil reservoir's capacity can thus be more efficiently exploited because a company that is extracting oil from the oil reservoir can more rapidly and more economically create a simulator to more accurately model the fluid flow of the reservoir.

The method and system for generating software code using a symbolic language translator of this invention provides an analyst who is typically a fluid dynamics expert, whose job it is to generate a simulator for modeling a physical system, with a working model of the particular physics, i.e., that particular set of equations that the analyst wants to model. The analyst thus has at his disposal a working discrete simulator.

Figure 6:
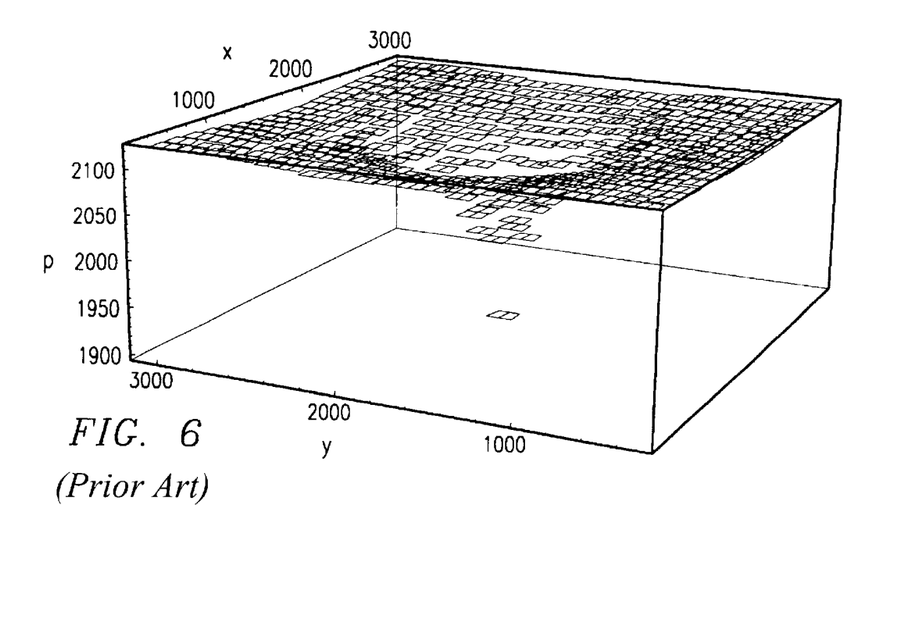
FIG. 6 shows a prior-art model discretization.
Figure 7:
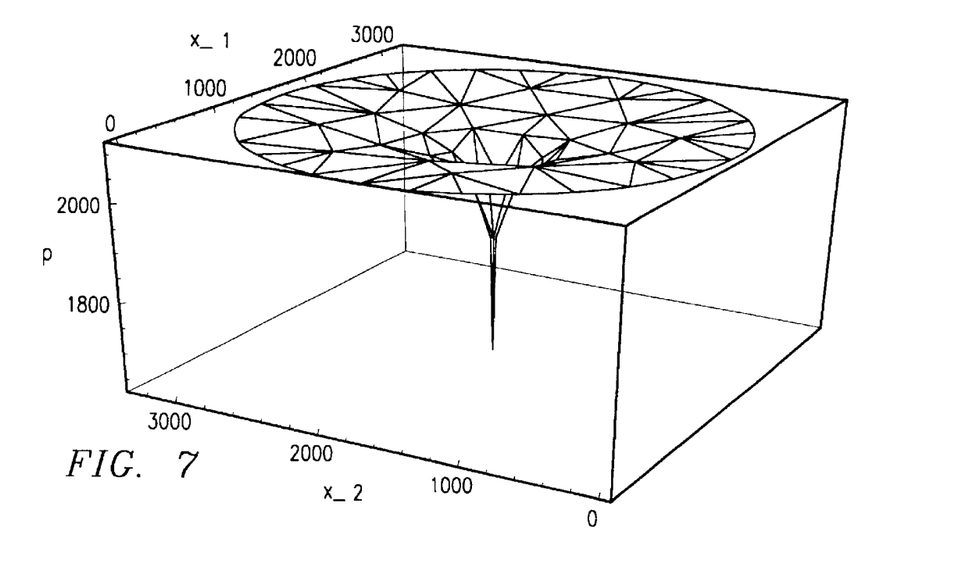
FIG. 7 shows a Finite Element solution of the same model shown in FIG. 6.

A working discrete simulator includes a user interface, a solver (a system that solves a set of equations for a discrete model, a match model or a discretizing type model) and native operators and test code 52 of the present invention. For example, FIG. 6 shows a prior-art model discretization. The model shown in FIG. 6 is a 1-phase 3D model of a well in the center of a circular reservoir. FIG. 7 shows a Finite Element solution of the same well using the method and system for generating software code using a symbolic language translator.

The model in FIG. 7 is likewise a discretized model and there exists a value for each of the nodes of the triangles that make up the model.

The method and system for generating software code using a symbolic language translator of the present invention allows a single analyst to generate from the partial differential equation description and physics description that they want modeled, a discrete simulator to solve the set of equations for a particular discrete model of the physical system so described. This discrete simulator can then be used by a second analyst, for example, a geochemical company, who is not interested in the creation of the simulator itself, but who is interested in creating a model using the simulator and who knows how to use the simulator.

This second analyst could be a group of fluid flow analysts and engineers whose job it is to solve a specific model problem using that simulator. The end-user second analyst in this case is interested in receiving a variety of physics in the simulator provided to them by the method and system for generating software code using a symbolic language translator of this invention. For example these analysts may want physics that can handle flow through porous or mixed media. This is where the expense and difficulty enters into prior art systems for creating a simulator because for each of these additional physics there is a whole new development cycle and a whole new batch of code that has to be generated.

Prior art systems require generating this new code in large part by hand, with skilled analysts and programmers entering and translating the data. The method and system for generating software code using a symbolic language translator of this invention automates this process and makes economically viable the generation of follow-up physics for the discrete simulator supplied to the end-user analyst. New physics can thus very quickly be added and a new simulator model created. In this sense, the title of this invention is a sort of product generation system.

The end user of the method and system for generating software code using a symbolic language translator of this invention can change the parameters of the equations used by the simulator to model, for example, the oil reservoir. The end user can likewise mathematically describe the wells that are pumping out oil from that reservoir and apply a boundary condition to the partial differential equations as describing the system and solve the equations using the simulator. The method and system for generating software code using a symbolic language translator of this invention provides a particular equation set simulator that allows an end-user analyst to model a particular physical system by inputting boundaries of that physical system into the simulator. The method and system for generating software code using a symbolic language translator of this invention thus provides an improved method and system for generating a Finite Element problem simulator to model a physical system such as fluid flow within porous media.

Figure 8:
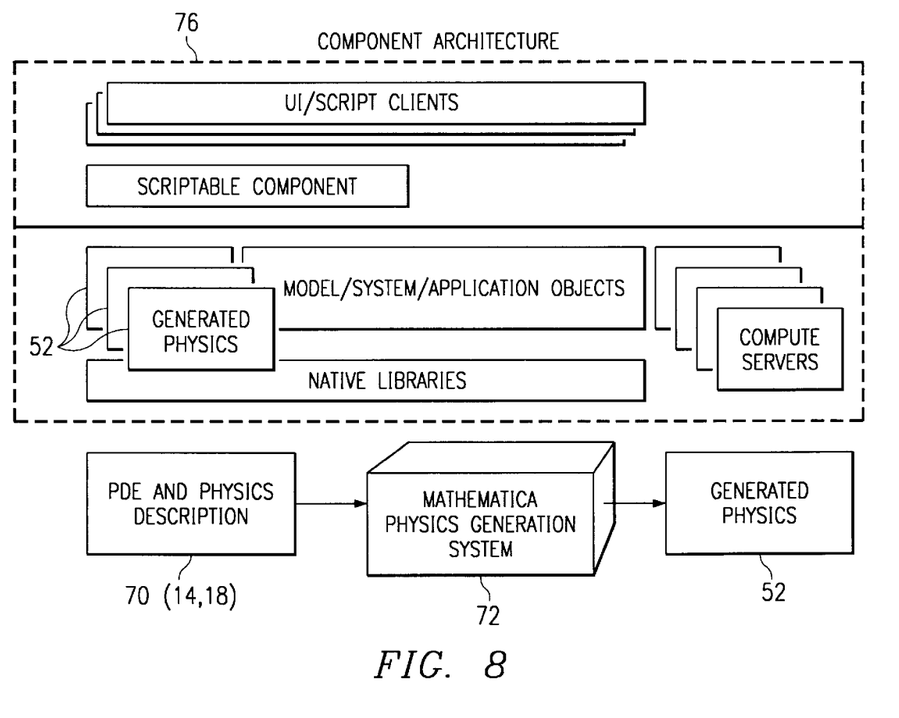
FIG. 8 shows an overview of a complete discrete simulator.

FIG. 8 provides an overview of a complete simulator that can be created using the method and system for generating software code using a symbolic language translator this invention. PDE and physics description 70 of FIG. 8 is the analyst input that must be solved to model a physical system in simulator 76. Mathematica physics generation system 72 takes the PDE and physics description as an input and outputs generated physics 52 (see FIG. 5), as previously described. Generated physics 52 can be multiple generated physics systems 52 and can be plugged into simulator 76 as shown in FIG. 5. Generated physics 52 can be dynamically available to the end-user analysts to use for modeling (not for data input). FIG. 8 shows, for example, three generated physics 52 that provide the end-user analysts a selection of physics from which to choose. A single simulator 76 can thus be used with different plugged-in generated physics 52.

By providing for multiple generated physics 52 to be used in simulator 76, more efficient and rapid turnaround is possible in an economically-viable amount of time when a change in a physical system requires the generation of a new description. Thus, for example, if a reservoir is encountered that has not yet been contemplated, a new generated physics can be created in a relatively short amount of time. An end user can provide the differential equations that need to be modeled and they can then be plugged into Mathematica physics generation system 72 to rapidly generate a simulator to be used to model those equations.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for creating on a computer a native operators and test code file for a finite element simulator to model fluid flow in a porous media, comprising the steps of:
   inputting into a symbolic language translator one or more equations and parameters describing the model to be created by the simulator;
   generating one or more model objects from the one or more equations and parameters;
   generating a symbolic representation for one or more residual and tangent matrix operators of the one or more model objects;
   generating optimization rules for geometric invariant quantities of the residual and tangent matrix operators;
   generating numeric core code and data structure initializing core code in a predetermined programming language from the language of the symbolic language translator;
   formatting and optimizing the numeric core code using the symbolic language translator;
   generating the native operators and test code file by processing the splice file through the symbolic language translator to yield the native operators and test code file.

2. The method of claim 1, wherein the inputting step comprises inputting the one or more equations and parameters using a graphical user interface to the symbolic language translator, the graphical user interface comprising a notational palette for entering mathematical symbols.

3. The method of claim 1, wherein the porous media comprises an oil reservoir.

4. The method of claim 1, further comprising the step of generating one or more error model objects and Dirichlet boundary condition model objects from the one or more model objects for estimating the error in the one or more equations, and wherein the generating a symbolic representation step further comprises generating the symbolic representation using the one or more error model objects.

5. The method of claim 4, wherein the model objects and the error model objects are intermediate user-viewable objects that can be used to verify progress.

6. The method of claim 1, wherein said generating optimization rules step comprises pre-calculating the geometric invariant quantities of a simplex.

7. The method of claim 6, wherein said pre-calculating comprises sorting one or more resulting equations for proper placement into the numeric core code.

8. The method of claim 1, wherein the optimization rules are semantic optimization rules.

9. The method of claim 1, further comprising the step of converting symbolic names from the language of the symbolic language translator to the high level programming language.

10. The method of claim 1, further comprising the step of generating a set of test inputs for one or more of the symbolic residual and tangent matrix operators and calculating the outputs of the one or more symbolic residual and tangent matrix operators based on the generated inputs to test for errors.

11. The method of claim 1, wherein the symbolic language translator is Mathematica.

12. The method of claim 11, further comprising the step of solving the one or more equations without using Mathematica's Integrate function.

13. The method of claim 1, wherein the one or more equations are partial differential equations.

14. The method of claim 13, wherein the one or more equations describe a four-dimensional physical system.

15. The method of claim 1, wherein the inputting step is performed by a human and all other steps are automatically performed by the computer.

16. The method of claim 1, wherein the simulator comprises a solver, a user interface and the native operators and test code file.

17. A system for creating on a computer a native operators and test code file for a finite element simulator to model fluid flow in porous media, comprising:
   means for inputting into a symbolic language translator one or more equations and parameters describing the model to be created by the simulator;
   instructions for generating one or more model objects from the one or more equations and parameters;
   instructions for generating a symbolic representation for one or more residual and tangent matrix operators of the one or more model objects;
   instructions for generating optimization rules for geometric invariant quantities of the residual and tangent matrix operators;
   instructions for generating numeric core code and data structure initializing core code in a high level programming language from the language of the symbolic language translator;
   instructions for formatting-and optimizing the numeric core code using the symbolic language translator; and
   instructions for generating the native operators and test code file by processing the splice file through the symbolic language translator to yield the native operators and testcode file.

18. The system of claim 17, wherein the inputting instructions further comprise instructions for inputting the one or more equations and parameters using a graphical user interface to the symbolic language translator, the graphical user interface comprising a notational palette for entering mathematical symbols.

19. The system of claim 17, wherein the porous media comprises an oil reservoir.

20. The system of claim 17, further comprising instructions for generating one or more error model objects from the one or more model objects for estimating the error in the one or more equations, and wherein the instructions for generating a symbolic representation further comprise instructions for generating the symbolic representation using the one or more error model objects.

21. The system of claim 20, wherein the model objects and the error model objects are intermediate user-viewable objects that can be used to verify progress.

22. The system of claim 17, wherein said instructions for generating optimization rules comprises pre-calculating the geometric invariant quantities.

23. The system of claim 22, wherein said pre-calculating comprises using a simplex method and matrix operations to calculate the geometric invariant quantities, and sorting one or more resulting equations for proper placement into the numeric core code.

24. The system of claim 17, wherein the optimization rules are semantic optimization rules.

25. The system of claim 17, further comprising instructions for converting symbolic names from the language of the symbolic language translator to the high level programming language.

26. The system of claim 17, further comprising instructions for generating a set of test inputs for one or more of the symbolic residual and tangent matrix operators and calculating the outputs of the one or more symbolic residual and tangent matrix operators based on the generated inputs to test for errors.

27. The system of claim 17, wherein the symbolic language translator is Mathematica.

28. The system of claim 27, further comprising instructions for solving the one or more equations without using Mathematica's integrate function.

29. The system of claim 17, wherein the one or more equations are partial differential equations.

30. The system of claim 29, wherein the one or more equations describe a four-dimensional physical system.

31. The system of claim 17, wherein the inputting means are a computer interface and wherein a human inputs the one or more equation and parameters and all other instructions are automatically performed by the computer.

32. The system of claim 17, wherein the high level programming language is Java, C++ or Fortran.

33. The system of claim 17, wherein the simulator comprises a solver, a user interface and the native operators and test code file.

* * * * *